(12) United States Patent
Kumbhari et al.

(10) Patent No.: US 9,716,631 B2
(45) Date of Patent: Jul. 25, 2017

(54) END HOST PHYSICAL CONNECTION ON A SWITCH PORT USING MULTIPLE ETHERNET FRAMES

(71) Applicant: International Business Machines Corporation, Armonk, NY (US)

(72) Inventors: Uday K. Kumbhari, Bangalore (IN); Rahul B. Rege, Ratnagiri (IN)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 14/522,806

(22) Filed: Oct. 24, 2014

(65) Prior Publication Data
US 2016/0119188 A1    Apr. 28, 2016

(51) Int. Cl.
| | | |
|---|---|---|
| H04L 12/28 | (2006.01) | |
| G06F 15/16 | (2006.01) | |
| H04L 12/24 | (2006.01) | |
| H04L 29/08 | (2006.01) | |
| H04L 12/861 | (2013.01) | |

(Continued)

(52) U.S. Cl.
CPC .......... *H04L 41/12* (2013.01); *G06F 9/45558* (2013.01); *H04L 49/90* (2013.01); *H04L 67/10* (2013.01); *H04L 67/12* (2013.01); *H04L 69/324* (2013.01); *G06F 2009/45595* (2013.01); *H04L 61/2038* (2013.01); *H04L 61/6022* (2013.01)

(58) Field of Classification Search
CPC ......... H04L 49/00; H04L 49/70; H04L 49/15; H04L 12/00; H04L 45/66; H04L 45/32; H04L 45/34; H04L 45/36; H04L 45/44; H04L 12/5689; H04L 12/5696; H04L 45/72; H04L 63/0245; H04L 41/0806; H04L 41/12; H04L 69/324; H04L 12/24; H04L 29/08; H04L 12/18; H04L 12/4641; H04L 12/4625; G06G 9/4558; G06G 9/45533; G06G 9/45541; G06G 9/00; G06G 9/45595
USPC ................ 709/203, 212, 213, 214, 223–226; 370/352, 254–256, 396, 381–385, 389, 370/400, 401, 406
See application file for complete search history.

(56) References Cited

U.S. PATENT DOCUMENTS

| | | |
|---|---|---|
| 7,478,145 B2 | 1/2009 | Braun et al. |
| 7,778,203 B2 | 8/2010 | Zhao et al. |

(Continued)

FOREIGN PATENT DOCUMENTS

EP    1811724 B1    8/2009

OTHER PUBLICATIONS

Lowekamp et al., "Topology Discovery for Large Ethernet Networks", SIGCOMM '01, Aug. 27-31, 2001, San Diego, California, USA, ACM 1-58113-411-8/01/0008, pp. 237-248.

*Primary Examiner* — Hanh N Nguyen
(74) *Attorney, Agent, or Firm* — David B. Woycechowsky

(57) ABSTRACT

Machine logic (for example, software) that performs the following steps: (i) providing a system including a first hypervisor and a first topology agent; (ii) running the topology agent on the hypervisor; (iii) dynamically creating a first unique address for the first topology agent; and (iv) storing the first unique address in a set of forwarding database (FDB) table(s) located on a set of network switch (es). Also, lightweight mechanisms on network switches for finding and/or clearing media access controller (MAC) addresses from FDB tables.

9 Claims, 6 Drawing Sheets

(51) Int. Cl.
*G06F 9/455* (2006.01)
*H04L 29/12* (2006.01)

(56) References Cited

U.S. PATENT DOCUMENTS

| | | | |
|---|---|---|---|
| 8,134,922 B2* | 3/2012 | Elangovan | H04L 12/1886 |
| | | | 370/230.1 |
| 8,270,318 B1 | 9/2012 | Kumbhari | |
| 8,879,554 B2* | 11/2014 | Emmadi | H04L 49/30 |
| | | | 370/389 |
| 9,094,302 B2* | 7/2015 | Nguyen | H04L 41/0806 |
| 2010/0257269 A1* | 10/2010 | Clark | G06F 9/4856 |
| | | | 709/226 |
| 2011/0264610 A1* | 10/2011 | Armstrong | G06F 15/17312 |
| | | | 706/12 |
| 2013/0322298 A1 | 12/2013 | Alexander, Jr. et al. | |
| 2015/0023358 A1* | 1/2015 | Tsirkin | H04L 41/0813 |
| | | | 370/401 |
| 2015/0117256 A1* | 4/2015 | Sabaa | H04L 49/15 |
| | | | 370/254 |
| 2015/0128245 A1* | 5/2015 | Brown | H04L 47/323 |
| | | | 726/12 |
| 2015/0280928 A1* | 10/2015 | Tessmer | H04L 12/4641 |
| | | | 370/390 |

* cited by examiner

END HOST PHYSICAL CONNECTION ON A SWITCH PORT USING MULTIPLE ETHERNET FRAMES

BACKGROUND OF THE INVENTION

The present invention relates generally to the field of ethernet networks, and more particularly to determining end host physical connections on ethernet networks.

Ethernet is a computer technology used for communicating over a local area network (LAN). An ethernet frame is a method of organizing data for transfer over the ethernet computer network. Data or commands that are transferred over the network are broken up into small portions of data called data packets. The data packet running on an ethernet link is called an ethernet packet. This ethernet packet is used to transport an ethernet frame as payload.

Layer 2 network topology is the data link layer in a data communications network that provides a link between two (2) directly connected nodes. In the field of network management, discovery of complete and accurate layer 2 network topology is helpful, if not required. In the context of data centers and cloud infrastructures, it is known that it is helpful to discover the physical connectivity: (i) between switches; and/or (ii) between switches and end hosts. Different techniques exist to discover a physical connection between a switch and an end host. One of these techniques is to use LLDP (link layer discovery protocol). This technique works only when both the switch and the end host are LLDP enabled. However, a network administrator may disable LLDP on switches for security reasons. Some switches may not even have support for LLDP protocol. Another technique is to check if a switch port is marked as "edge" in the STP (spanning tree protocol) configuration. STP is usually disabled when the network is configured so that there is no possibility of creating loops. Yet another technique is to analyze the FDB (forwarding database) tables of the switches. Switches "learn" the MAC (media access control) addresses of possible destinations by observing the source MAC addresses of packets arriving into the switch through its different ports.

SUMMARY

According to an aspect of the present invention, there is a method, computer program product and/or system that performs the following steps (not necessarily in the following order): (i) providing a system including a first hypervisor and a first topology agent; (ii) running the topology agent on the hypervisor; (iii) dynamically creating a first unique address for the first topology agent; and (iv) storing the first unique address in a set of forwarding database (FDB) table(s) located on a set of network switch(es).

DETAILED DESCRIPTION

Figure 1:
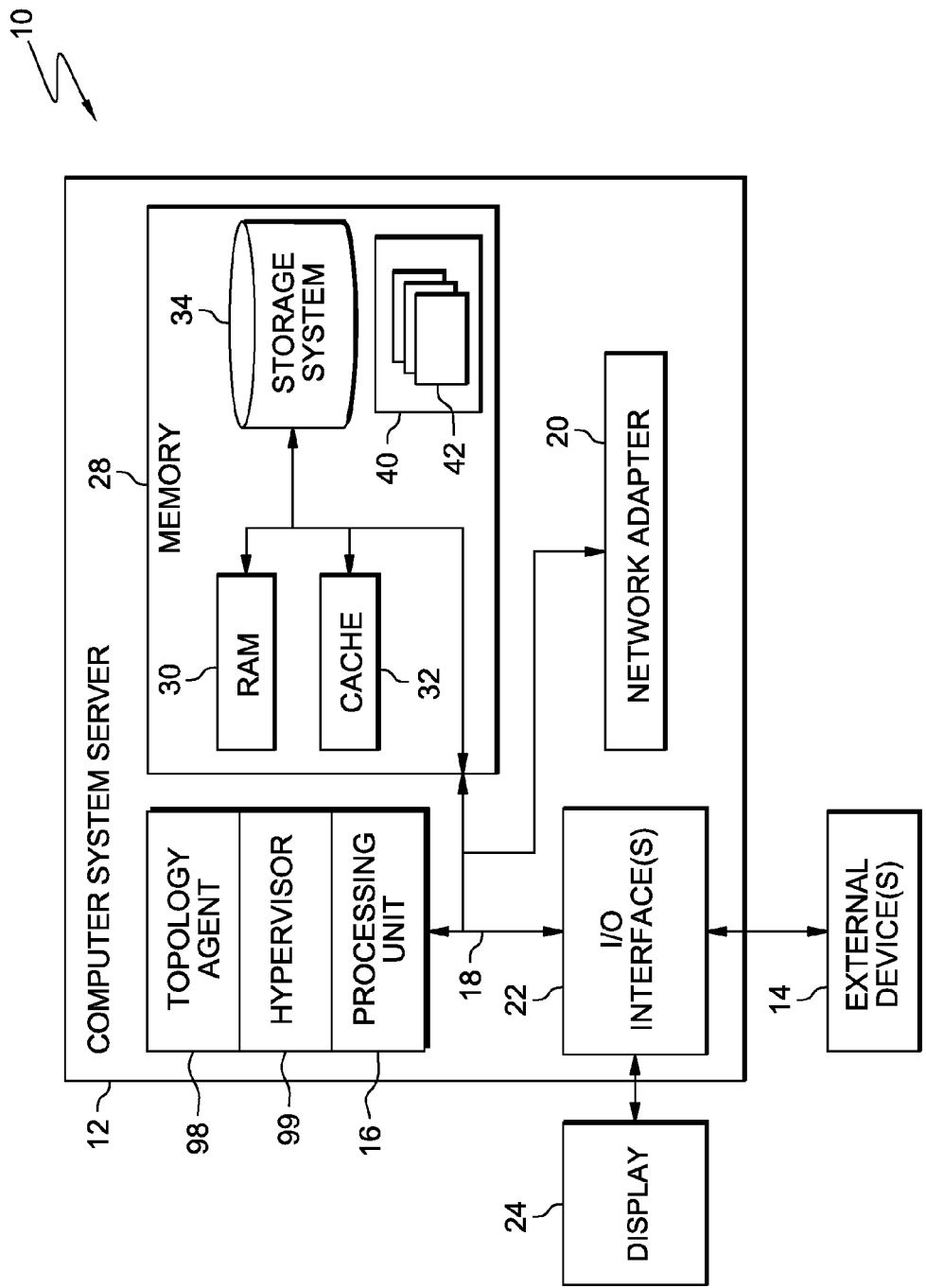
FIG. 1 depicts a cloud computing node according to an embodiment of the present invention.

In some embodiments a dedicated agent, named a topology agent, runs on the hypervisor. Management software instructs the hypervisor to start and stop the topology agent when required. In some embodiments, a light-weight mechanism implemented on the ethernet switches such that the management software can: (i) query specific information; and (ii) instruct the ethernet switch to clear a specific MAC (media access control) address from all its FDB (forwarding database) tables. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
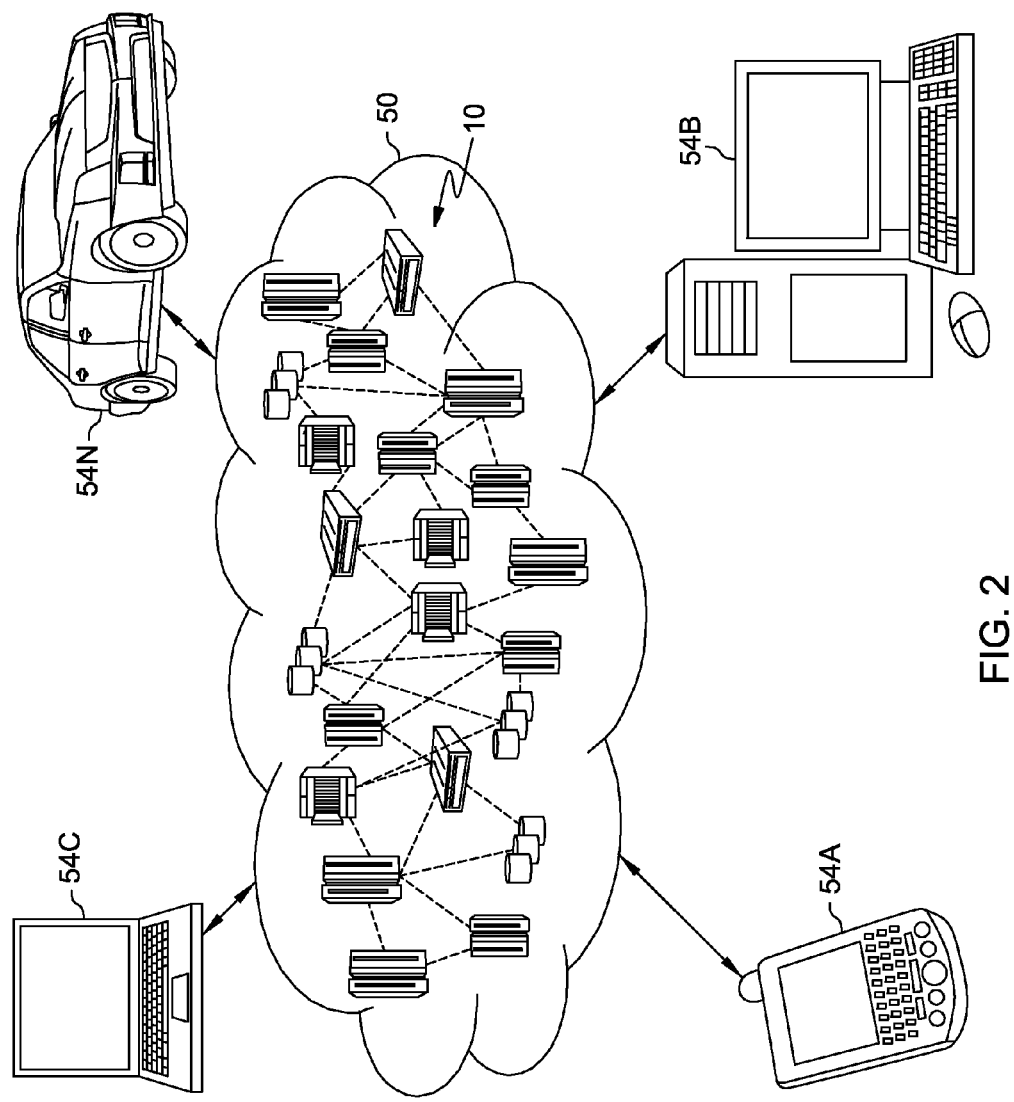
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
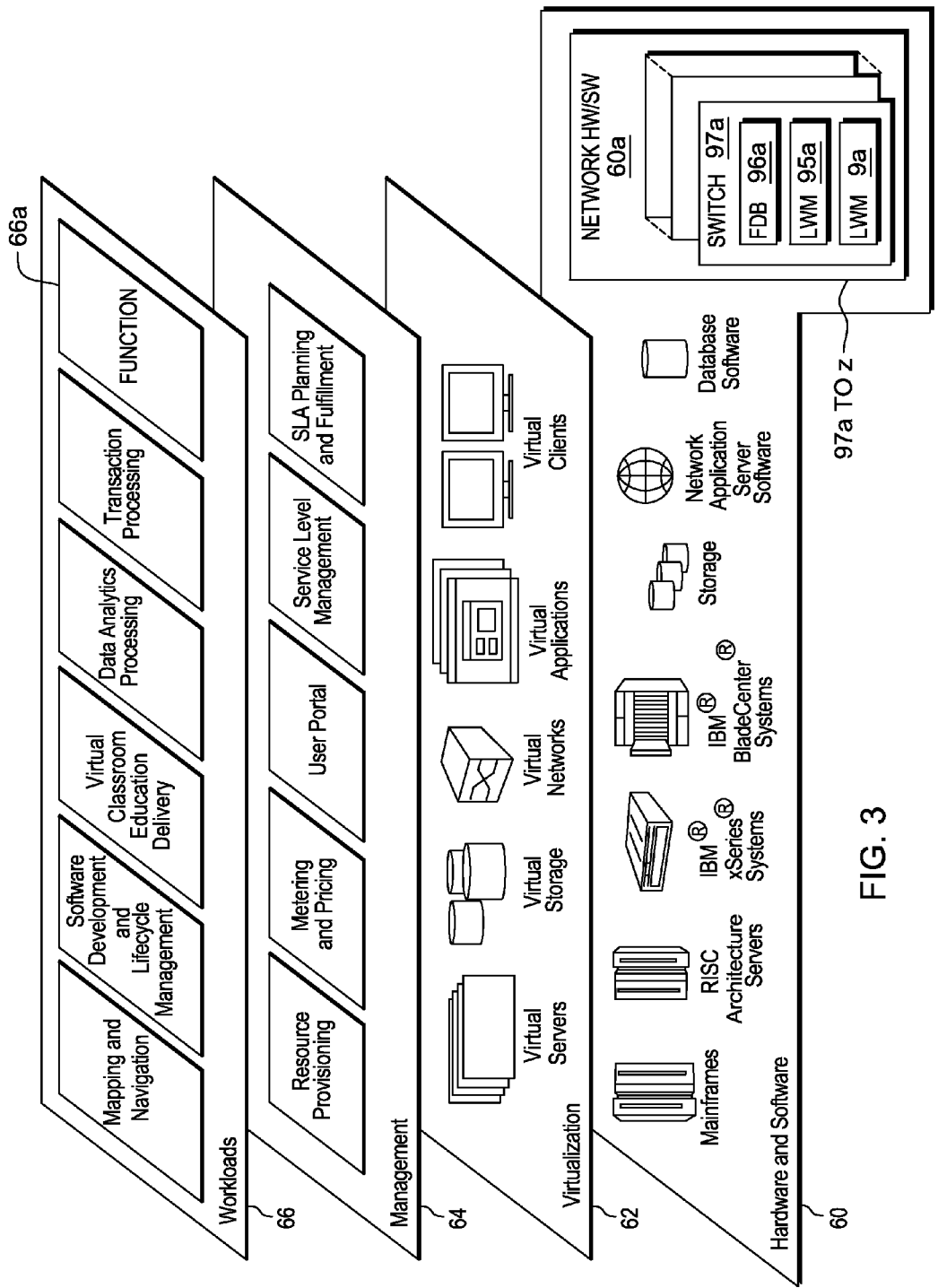
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and determining the end host physical connection on a switch port. Function block 66a represents the functionality(ies) of some embodiments of the present invention, which functionality(ies) will be further discussed below.

II. Example Embodiment

Before discussing the flow chart of FIG. 4, some information about how the forwarding database (FDB), MAC addresses and switch ports of this embodiment operate will now be discussed. In the method of the flow chart of FIG. 4, a "topology agent" is used to help create a better information regarding of data communication flow through cloud 50 (see FIG. 2) and its switch ports by using FDB records existing at various network switches 97a to 97z (see FIG. 3), so it is helpful to fully understand how these portions of the embodiment work.

FDB (Forwarding DataBase) is a table in the memory of the network switch that captures which MAC address was learnt on which switch port. In other words, it captures which destination MAC address can be reached through which switch port. For example, in this example, the FDB table is as follows:

| MAC Address | Switch Port |
| --- | --- |
| 00:00:00:00:00:01 | A1 |
| 00:00:00:00:00:02 | A2 |
| 00:00:00:00:00:03 | A1 |
| 00:00:00:00:00:04 | A3 |

The first record in the this FDB table means that a first ethernet packet with source MAC address of 00:00:00:00:00:01 was received by the switch on port A1, so it "learned" the MAC address 00:00:00:00:00:01 on port A1, and updated the FDB table accordingly. From this point onwards, if the switch receives any ethernet packet with a destination MAC address of 00:00:00:00:00:01, it would forward that packet out of port A1. Each FDB table record has a time out and would expire eventually, at which time that record is removed from the FDB table.

Under currently conventional technology, the network switch usually provides a way to fetch the records from the FDB table. Usually it provides this information through: (i) SNMP (simple network management protocol); (ii) switch command line interface (CLI); or (iii) some programmatic API (application program interface). For example, there is a SNMP MIB table named dot1dTpFdbTable, defined by a standard form, format and/or protocol, which lists all the FDB records. Therefore, under currently conventional technology, it is possible to check for the presence of a specific MAC address (or a specific set of MAC addresses), and if present, against which switch port(s). Fetching the entire FDB information is what is usually done by most NMS (network management system) products today. However, fetching of the entirety of the FDB information is a resource-intensive operation.

In the example method of the flowchart of FIG. 4, to be discussed below, instead of fetching the entirety of the FDB information, a single matching FDB entry, if present, is fetched. This selective fetching of a single FDB record is sometimes herein referred to as a "light-weight mechanism." This operation of fetching a single FDB record is not provided and/or supported currently on most network switches through switch CLI and other programmatic mechanisms. In some embodiments of the present invention, this operation of fetching a single FDB record is made available through CLI and/or other programmatic mechanisms.

In some embodiments of the present invention, the network switches provide and support an operation to selectively clear a single FDB table record corresponding to a single MAC address (or a set of FDB records corresponding to a set of MAC addresses). This is also sometimes referred to herein as a "lightweight mechanism" because, as with the lightweight mechanism for selectively reading single FDB records (or selective sub-sets of multiple FDB records), this selective clearing operation does not involve communication of the entirety of the FDB table. Both light-weight mechanisms (selective FDB record fetching and selective FDB record clearing) can be provided and supported through SNMP, CLI or other programmatic mechanisms.

Figure 4:
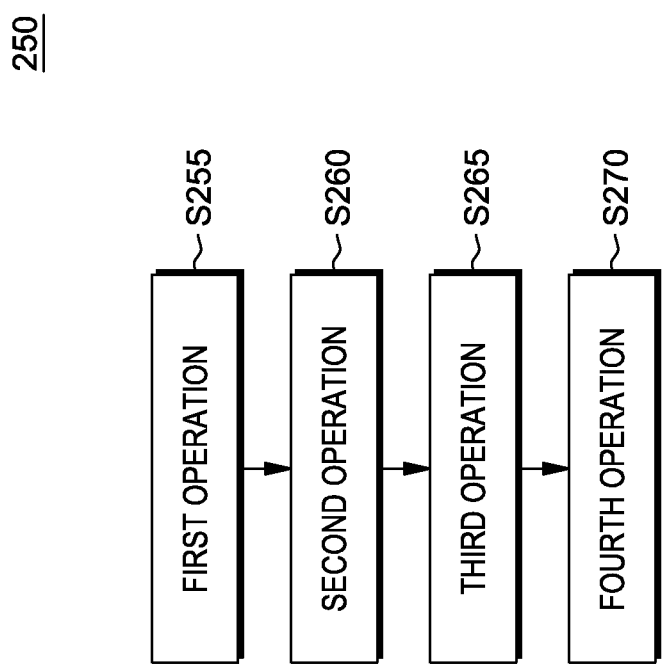
FIG. 4 is a flow chart view of a first embodiment of a method according to the present invention.

FIG. 4 shows flowchart 250 depicting a method according to the present invention. This method and some of its associated hardware/software will now be discussed, over the course of the following paragraphs, with extensive reference to FIG. 4 (for the method step blocks) and FIGS. 1 and 3 (for the hardware/software blocks).

Processing starts at step S255, where processing unit 16 and hypervisor 99 begin running topology agent 98. In this embodiment, topology agent (TA) 98 is assigned a unique MAC address, specifically "TA-MAC." More specifically, at step S255, the following operations occur: (i) Network Management Software (NMS, not separately shown in FIGS. 1 to 3) instructs the hypervisor 99 to start the TA 98; (ii) hypervisor 99 starts TA 98 and sends details about topology agent 98 (such as its unique MAC address) to NMS through network adapter 20 and network 50 (see FIG. 2); and (iii) the NMS sends the ethernet MAC addresses of all switches 97a to 97z in the network to hypervisor 99, which, in turn, passes the ethernet MAC addresses of the switches on to TA 98.

Processing proceeds to step S260 where hypervisor 99 instructs TA 98 to send an ethernet packet (not separately shown) to each switch 97a to 97z.

More specifically, at step S260, the following operations are performed (first for switch 97a): (i) the ethernet packet reaches switch 97a through any other connected switches, of switches 97b to 97z, that are located on the data communication path through cloud 50, between hypervisor 99 and switch 97a; (ii) along the data communication path traversed by the ethernet packet, each switch learns the MAC address of topology agent on one of its switch ports and updates its FDB (96b to 96z, as applicable) to add an FDB record which identifies topology agent 98 and associates it with its unique MAC address (in this example, "TA-MAC"); (iii) hypervisor 99 notifies NMS, through network adapter 20 and cloud 50, that the ethernet packet has been sent by TA 98 to switch 97a; (iv) the NMS queries each switch 97a to 97z to locate and FDB records 97a to 97z, if any, which match the unique address for topology agent 98 (that is, in this example, "TA-MAC"); (v) in this example, where TA 98 has only recently been started up, only those switches that are located on the data communication path from hypervisor 99 to switch 97a (inclusive of switch 97a), will return one matching FDB record each to NMS; and (vi) the NMS instructs all switches 97a to 97z (or, alternatively, only those switches that returned matching FDB records) to clear any FDB record matching TA-MAC from their respective FDB tables.

At step S260, the operations of the previous paragraph (performed with respect to switch 97a in the descriptions of the previous paragraph) are repeated for every other switch in the system (that is, switches 98b to 98z).

Processing proceeds to step S265, where the NMS determines how directly each switch 97a to 97z is connected to hypervisor 99. There are several possibilities that will be respectively discussed in the following paragraphs.

FIRST POSSIBILITY. Assume that the ethernet packet sent to switch 97a at step S260 resulted in switch 97a, and only switch 97a, returning an FDB record to NMS. As a result of this pattern of returned data from step S260, the NMS effectively determines that hypervisor 99 is directly connected to switch 97a on the port present in the matching FDB record which was returned in response to the sending of the ethernet packet from hypervisor 99 to switch 97a.

SECOND POSSIBILITY. Assume that the ethernet packet sent to switch 97b at step S260 resulted in switch 97b, and also switch 97c, returning an FDB record to the NMS. As a result of this pattern of returned data from step S260, the NMS effectively determines that: (i) hypervisor 99 is only indirectly connected to switch 97b through intermediate switch 97c; (ii) hypervisor 99 is connected to switch 97b on the port that is present in the matching FDB record sent from switch 97b to the NMS at step S260 in response to the ethernet packet sent to switch 97b; and (iii) switch 97c (rather than switch 97b) is directly connected to hypervisor 99.

THIRD POSSIBILITY. Assume that the ethernet packet sent to switch 97d at step S260 resulted in switch 97d, switch 97e and switch 97f all returning an FDB record to the NMS. As a result of this pattern of returned data from step S260, the NMS effectively determines that: (i) hypervisor 99 is only indirectly connected to switch 97d through intermediate switches 97e and 97f; (ii) hypervisor 99 is connected to switch 97d on the port that is present in the matching FDB record sent from switch 97d to the NMS at step S260 in response to the ethernet packet sent to switch 97d; and (iii) only one of the two switches 97e or switch 97f is directly connected to hypervisor 99, but it is not known which one.

The collection of hypervisor connection information accomplished at steps S255 to S265 will now be further discussed in the following paragraphs.

The collection of information at step S265 is helpful because other methods of collecting this needed information are not always possible. For example: (i) LLDP may be disabled/unsupported on the switch or the end host; (ii) STP may not be configured; and/or (iii) link aggregation may not be configured. The information collected at step S265 may be more accurate than other conventional methods, such as methods that use FDB tables. The collection of information at step S265 may be faster than other methods available today that use FDB tables—these conventional methods query entire FDB tables before they start processing the data. On the other hand, the information collection of step S265 queries just enough information from the FDB tables.

In some embodiments, the hypervisor connection information collection of steps S255 to S265 is suitable for server virtualized environments; in such environments the MAC addresses are allotted to the VMs by the Hypervisor and as VMs come and go, the MAC addresses being seen originating on a physical host are dynamic. In some cases where the MAC addresses are allotted to the VMs by an entity that operates at the network level (like a network-wide hypervisor or a distributed hypervisor), a VM carries its MAC address as it is migrated from one physical hot to another, and this will only confuse conventional FDB based discovery methods further.

This information collection of steps S265 can be customized to be quick (that is, run until either FIRST POSSIBILITY or SECOND POSSIBILITY, as will be described in more detail below) and only focus on discovering switch to end host connections. This information collection of step S265 can be done fully (that is, run the algorithm for every switch) to discover switch to switch connections also.

Processing proceeds to step S270, where the information collected at step S265 is used in controlling communications operations. In these communications operations (herein referred to as "normal operations"), it is useful to know which switch ports have a direct connection to hypervisor 99, and which switch ports do not, as will be readily appreciated by those of skill in the art.

A variation on method 250 will now be discussed. Under this variation, if an Ethernet packet was sent to switch A, and if more than two (2) switches returned FDB entries, one each, to NMS, then there are multiple switches in the path from hypervisor 99 to switch A. Assume that the switches that returned FDB entries are A, B, C and D. Then the entire process can be repeated starting from step S260, described above, but once for each of switches B, C and D. If there are other switches, E, F and G in the network, there is no need to repeat the process for switches E, F and G. While running the process for switches B, C and D, the degree of directness of connection between hypervisor and the switch port will have already been effectively determined and the process can be stopped. To this end, the NMS can send a further instruction to Hypervisor to repeat the process only for switches B, C and D, and not for the others. Hypervisor 99 can in-turn pass this instruction to topology agent 98.

III. Further Comments and/or Embodiments

It is very common for hypervisors to have multiple network adapters for reasons like need for higher bandwidth, network adapter level redundancy, connectivity to multiple switches for access to multiple physical networks, or switch level redundancy, etc. In this disclosure, for the sake of simplicity, it is considered that the hypervisor has a single network adapter. However, in some embodiments of the present invention where the hypervisor has multiple network adapters, the processes described in this disclosure may be applied to each of those network adapters. In this disclosure, the words "network adapter" and "network port" are used inter-changeably. Some embodiments of the present invention may be limited to ethernet network adapters and ethernet switches only.

Some embodiments of the present invention include a dedicated agent, herein called a "Topology Agent." In some embodiments with a Topology Agent: (i) the Topology Agent runs on a hypervisor; (ii) the management software instructs the hypervisor to start and stop the Topology Agent when required; (iii) the Topology Agent is assigned a unique, dynamically created MAC address by the hypervisor; and/or (iv) this MAC address will be searched for in the FDB tables on the switches in the network.

Some embodiments of the present invention include a light-weight mechanism implemented on the switches such that the management software can determine if a particular MAC address has been learned in the FDB tables on any port, and if so, on which port. For example, dot1dTpFdbTable SNMP MIB (management information base) table present in RFC (request for comments) 4188 "BRIDGE-MIB", provides a way to run SNMP GET requests on dot1dTpFdbTable indexed by a specific MAC address. If that MAC address has already been learned on any port of the switch, then a SNMP GET request can be used to obtain the dot1dBasePortIfIndex of that port and determine whether the port: (i) has learned the MAC address; (ii) is statically configured; and/or (iii) is in any other possible status. As another example, the switch vendor/supplier can also provide this function through a command line interface.

Some embodiments of the present invention include a light-weight mechanism implemented on the switches, such that the management software can instruct the switch to clear a specific MAC address from all its FDB tables, if present. This function can be provided by a command line interface by the switch vendor/supplier. As an example, some computer networking companies provide commands such as "clear fdb" that can be used to clear a specific MAC address from the FDB tables on its ethernet switches.

Some embodiments of the present invention may further include one, or more, of the following features, characteristics, and/or advantages: (i) introduction of the Topology Agent inside the hypervisor; (ii) introduction of a light-weight mechanism on the switches to allow queries for specific MAC addresses in the FDB tables; (iii) a light-weight mechanism to allow specific MAC addresses to be cleared from the FDB tables; (iv) does not incur the compute-intensive processing of a lot of network traffic; (v) does not incur the compute-intensive generation of a lot of network traffic; and/or (vi) does not have any dependency on LLDP and STP.

Some embodiments of the present invention may further include one, or more, of the following features, characteristics, and/or advantages: (i) discovering physical connections between switch ports and end hosts in a data center (with server virtualization) becomes very efficient; (ii) discovering physical connections between switch ports and end hosts in a cloud infrastructure environment (with server virtualization) becomes very fast; (iii) re-discovering physical connections can be triggered whenever required; (iv) re-discovering physical connections can be done very quickly; (v) re-discovering physical connections can give accurate results; (vi) discovery of physical connections can be specifically pointed to a particular end host; and/or (vii) discovery of physical connections can be extended to every end host in the network.

Figure 5:
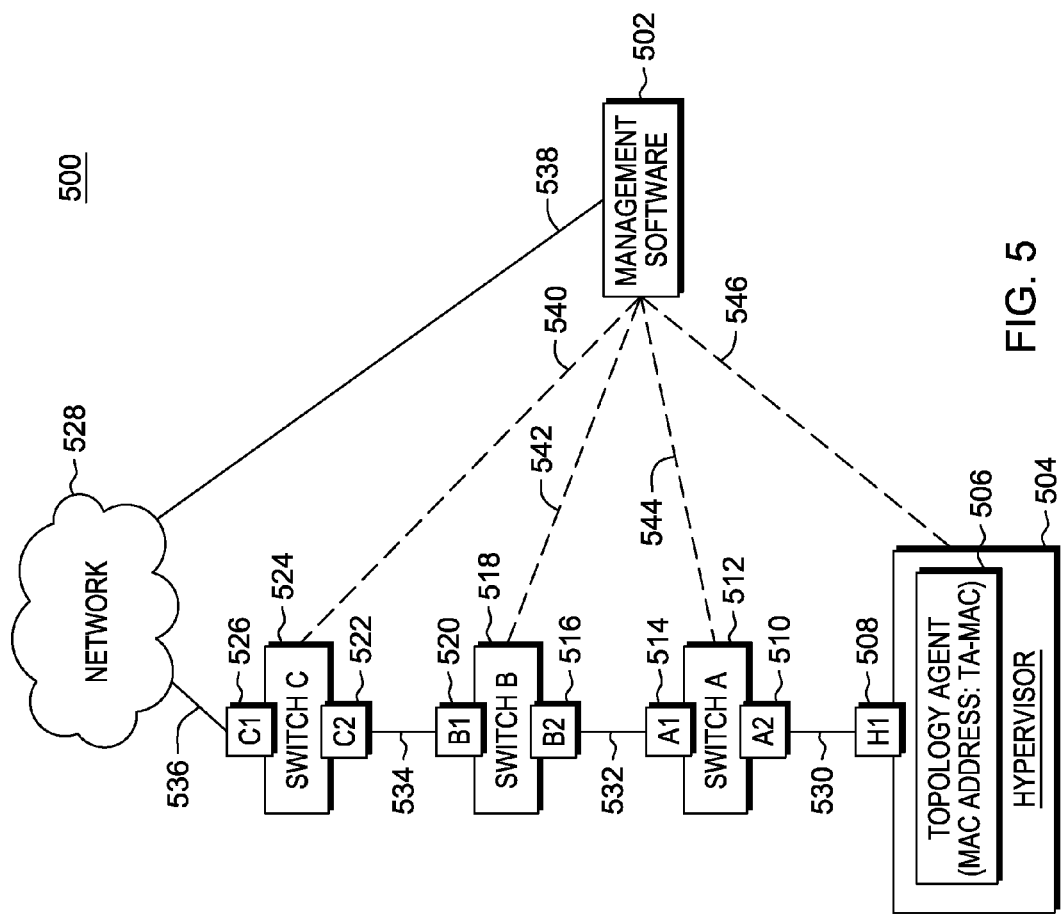
FIG. 5 is a system diagram view showing information that is generated by and/or helpful in understanding embodiments of the present invention.

As shown in FIG. 5, system 500 includes: management software 502; hypervisor 504; topology agent (MAC address: TA-MAC (topology agent-media access control)) 506; network port H1 508; switch A port A2 510; switch A 512; switch A port A1 514; switch B port B2 516; switch B 518; switch B port B1 520; switch C port C2 522; switch C 524; switch C port C1 526; network 528; and communication paths 530, 532, 534, 536, 538, 540, 542, 544, 546. System 500 represents a network topology.

The hypervisor 504 is physically connected through its physical network port H1 508 to port A2 510 on switch A 512 using communication path 530, which is connected through its port A1 514 to port B2 516 on switch B 518 using communication path 532, which is in turn connected through its port B1 520 to port C2 522 on switch C 524 using communication path 534. When a packet is sent from the hypervisor 504 to any destination in the network 528 beyond the switch C 524 or to the switch C 524, the MAC address of the hypervisor 504 will be learned by all the three (3) switches and will appear in the FDB tables on port A2 510 of switch A 512, port B2 516 of switch B 518 and port C2 522 of switch C 524. It will not be possible for the management software 502, which is responsible for the layer 2 network topology discovery, to determine whether the hypervisor 504 is physically connected to: (i) port A2 510 of switch A 512; or (ii) port B2 516 of switch B 518; or (iii) port C2 522 of switch C 524. Alternatively, a system designer can chose among the three (3) choices mentioned in the previous sentence.

Various embodiments of the present invention assume the management software 502 has discovered: (i) the presence of the hypervisor 504; (ii) switches A 512, B 518 and C 524; (iii) no other switch exists in the current path of switches; (iv) there is a communication channel open to the hypervisor 504; and (v) there is a communication channel open to the switches. Various embodiments of the present invention further assume the communication path may occur over: (i) a proprietary TCP/IP (transmission control protocol/internet protocol) connection; (ii) a SNMP or SSH (secure shell)/Telnet; and/or (iii) any other mechanism. This also means that the management software 502 is knowledgeable about the management IP (internet protocol) addresses of each of the three (3) switches in the network. Some embodiments assume the management software 502 has discovered the bridge MAC addresses for the three (3) switches (switch A 512, switch B 518, and switch C 524) respectively. While each physical switch port has its own MAC address, each switch (also called a bridge) also has a layer 2 identity for itself, known as the bridge MAC address, or dot1dBaseBridgeAddress, for that switch. It is this bridge MAC address that the switch uses to identify itself in all bridge-bridge communication packets, that is, BPDUs (Bridge Protocol Data Units). In at least some embodiments, the foregoing assumptions are realistic because almost all layer 2 network topology discovery products satisfy these assumptions.

In some embodiments of the present invention, a dedicated agent, named topology agent 506, is run on the hypervisor 504 on demand. The management software 502 can instruct the hypervisor 504 to start and stop the topology agent 506 when required. As the hypervisor 504 brings up the topology agent 506, the hypervisor 504 assigns a specific dynamic MAC address to the topology agent 506. This is a specific MAC address that the hypervisor 504 will never assign to any VMs that would run on the hypervisor 504. It must not match with any MAC address that the hypervisor 504 may have created in future, present, or past. This is necessary to make sure that it is possible to track the MAC address of the topology agent 506 in the FDB tables of the switches (switch A 512, switch B 518, and switch C 524). The hypervisor 504 also informs the management software 502 that the topology agent 506 has been started and also informs the topology agent's 506 MAC address to the management software 502.

The management software 502 passes on the bridge MAC addresses of the switches A, B and C (512, 518 and 524 respectively) to the hypervisor 504 using communication paths 544, 542, 540 and 546 respectively. The hypervisor 504 in turn passes these MAC addresses to the topology agent 506. The topology agent 506 then prepares ethernet frames, one destined to each bridge MAC address, and then sends them one after another. In each of these ethernet frames, the source MAC address is the MAC address of the topology agent 506.

One embodiment of the present invention assumes that the bridge MAC address, that is, the dot1dBaseBridgeAddress of a switch is the physical MAC address of one of its interfaces, which is common. If this is not the case, then one of the physical interfaces' MAC address must be picked up as the bridge MAC address for each corresponding bridge.

In some embodiments of the present invention, and again referencing FIG. 5, after sending each ethernet frame, the management software 502 is informed that the ethernet frame has been sent to a particular bridge MAC address. Before the next ethernet frame is sent by the topology agent 506, the management software 502 communicates with each of the switches (switch A 512, switch B 518, and switch C 524) using communication paths 544, 542 and 540 respectively, to find out if the topology agent's 506 MAC address has been learned on any of their ports. Once this query is completed, the management software 502 instructs each switch, using the communication paths, to drop the topology agent's 506 MAC address if it is learned on any of its ports. After this step, the management software 502 instructs the hypervisor 504, using communication path 546, to allow the topology agent 506 to send the next ethernet frame destined for another bridge MAC address. As a possible short-cut variation, as soon it is found that the topology agent's 506 MAC address is learned on a port on a single switch, the algorithm can be stopped and it can be declared that the hypervisor 504 is physically connected to that switch port.

After repeating the steps outlined in the above paragraph, once for each bridge MAC address, the management software 502 instructs the hypervisor 504 using communication path 546 to shut down the topology agent 506, and start analyzing the data collected from the switches (switch A 512, switch B 518, and switch C 524).

Figure 6:
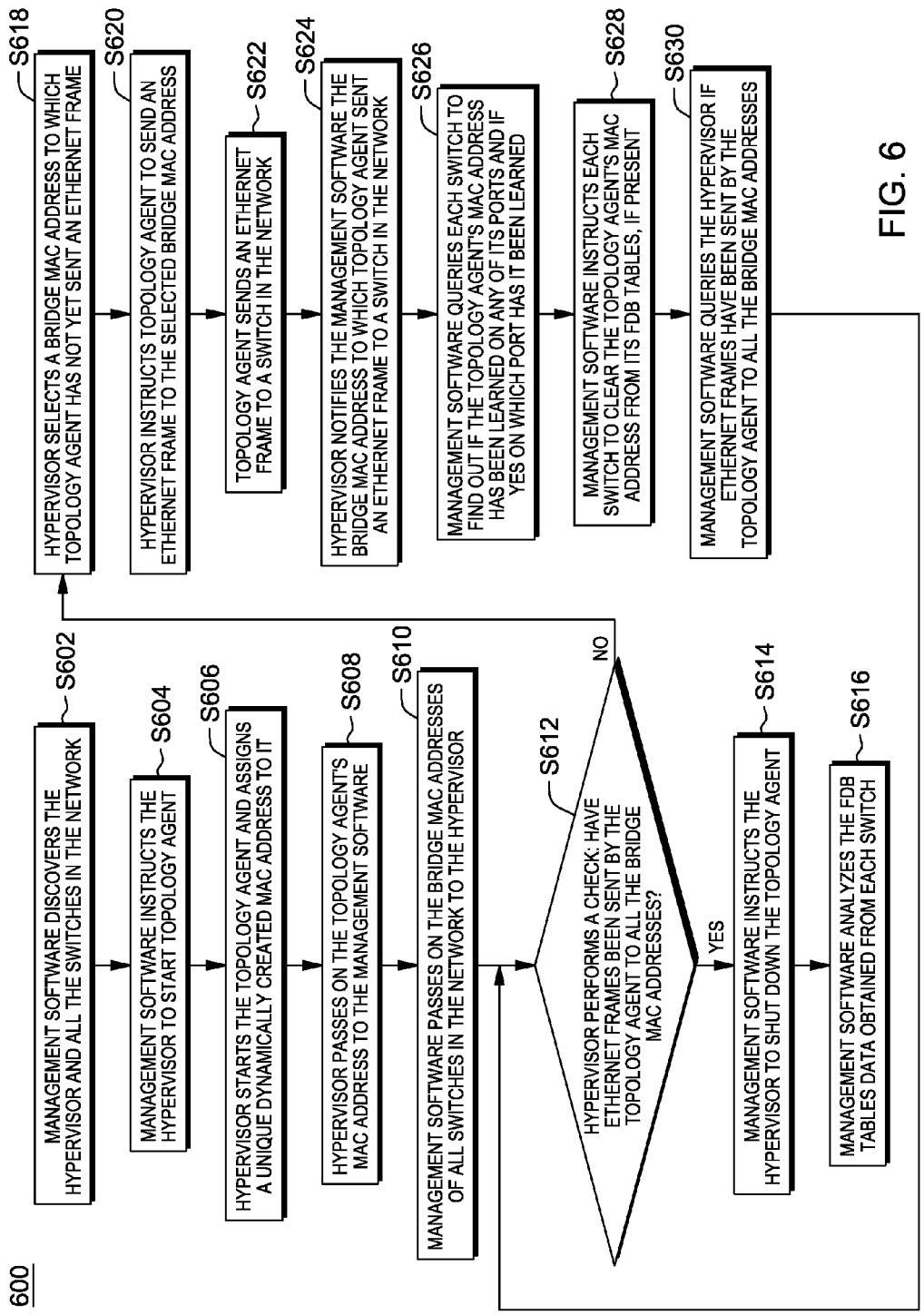
FIG. 6 is a flow chart view of a second embodiment of a method according to the present invention.

FIG. 6 shows a flow chart 600 depicting a method according to the present invention. Processing begins at step S602 where management software 502 discovers the hypervisor 504 and all the switches (switch A 512, switch B 518, and switch C 524) in the network.

Processing continues to step S604 where the management software 502 instructs the hypervisor 504 to start the topology agent 506 using communication path 546.

Processing continues to step S606 where the hypervisor 504 starts the topology agent 506 and assigns a unique dynamically created MAC address (MAC address: TA-MAC).

Processing continues to step S608 where the hypervisor 504 passes on the topology agent's 506 MAC address to the management software 502 using communication path 546.

Processing continues to step S610 where the management software 502 passes on the bridge MAC address of all the switches (switch A 512, switch B 518, and switch C 524 using communication paths 544, 542, and 540 respectively) in the network to the hypervisor 504.

Processing continues to step S612 where the hypervisor 504 performs a check to determine if the ethernet frames have been sent by the topology agent 506 to all bridge MAC addresses. If the ethernet frames have been sent (Yes), processing continues to step S614 where the management software 502 instructs the hypervisor 504 to shut down the topology agent 506 using communication path 546.

Processing concludes at step S616 where management software 502 analyzes the FDB table data obtained from each switch (switch A 512, switch B 518, and switch C 524).

At step S612 above, if the hypervisor 504 determines that the ethernet frames have not been sent by the topology agent (No), processing continues to step S618 where the hypervisor 504 selects a bridge MAC address to which topology agent 506 has not yet sent an ethernet frame.

Processing continues to step S620 where the hypervisor 504 instructs topology agent 506 to send an ethernet frame to the selected bridge MAC address.

Processing continues to step S622 where topology agent 506 sends an ethernet frame to a switch in network (switch A 512, switch B 518, or switch C 524).

Processing continues to step S624 where the hypervisor 504 notifies the management software 502, using communication path 546, the bridge MAC address to which topology agent 506 sent an ethernet frame to a switch in the network.

Processing continues to step S626 where management software 502 queries each switch (switch A 512, switch B 518, and switch C 524 using communication paths 544, 542, and 540 respectively) to find out if the topology agent's 506 MAC address has been learned on any of its ports, and if yes, on which port it has been learned.

Processing continues to step S628 where the management software 502 instructs each switch (switch A 512, switch B 518, and switch C 524 using communication paths 544, 542, and 540 respectively) to clear the topology agent's 506 MAC address from it's FDB tables, if present.

Processing continues to step S630 where management software 502 queries the hypervisor 504 using communication path 546 if the ethernet frames have been sent by the topology agent 506 to all the bridge MAC addresses.

Processing then loops back to step S612 where the hypervisor 504 again performs a check to determine if the ethernet frames have been sent by the topology agent 506 to all bridge MAC addresses.

In some embodiments of the present invention, the EtherType for the ethernet frames must be selected such that the switch does not drop the frame but instead floods it to other ports if it does not find the destination MAC address to be its own bridge MAC address. As an example, address 0x0800 which represents an IPv4 payload, can be a possible EtherType value, but there can be other EtherType values that do not block the current purpose.

In some embodiments of the present invention, if the switches in the network are 802.1Q switches, then they support VLANs (virtual local area network). Using VLANs it is possible to divide a single switched network (or a single physical LAN (local area network) spanning one or more connected switches) into multiple virtual networks. Packets originating from a specific VLAN will be forwarded only to destinations within that VLAN. The ethernet frames being sent from the topology agent must be able to reach all the switches. For example, as shown in FIG. 5, the VLANs and related settings (like PVID (port virtual local area network), tagging, trunking, etc.) on the switch ports along the communication paths 530, 532, and 534 from the hypervisor 504 through switch A 512, switch B 518, and switch C 524, must be configured such that the ethernet frames sent by the hypervisor must be able to reach switch A 512, switch B 518 and switch C 524. This is considered a pre-requisite by at least some embodiments of the present invention.

The way in which system 500, of FIG. 5, may be integrated into a cloud computing environment, such as that shown in FIGS. 1 to 3, will now be discussed with reference to FIGS. 1, 2, 3 and 5. In this embodiment, hypervisor 504 takes the form of physical computer server hardware used for virtualization and creation of the VMs, so hypervisor 504 can be mapped: (i) in FIG. 1 to computer system server 12; (ii) inside cloud 50 of FIG. 2; and (iii) in FIG. 3 to hardware and software layer 60 because hypervisor 504 is server hardware on top of which virtualization layer is built.

Other components outside of cloud 50 represent consumers like a laptop, a PC, a car and a cellphone. In other words, hypervisor 504 can be mapped to any of the units that represent compute servers inside the cloud in FIG. 2. From a private cloud perspective, network switch 512 forms the basis of the network fabric that connects the hypervisors 504 and other servers in the chassis/rack to form a cloud. Components 512, 518 and 524 are located inside of cloud 50 (see FIG. 2) because these components interconnect the hypervisors and other components, like storage. With respect to FIG. 3, network switch 512 is located in the lowermost layer (that is, hardware and software layer 60), and, more specifically, to the networking block (no separate reference number). Generic network fabric 528 connects the internal switch, as well as to an outside network. As shown in FIG. 2, generic network fabric 528 is therefore located in interlinks between the devices inside cloud 50, as well as outside cloud 50. Network management software program 502 could run on any server or a virtual machine, that may or may not be directly connected to the switches. As shown in FIG. 1, program 502 would run on top of the physical computer server system 12. As shown in FIG. 2, the location of program 502 could be in blocks 54a, 54b and/or 54c, or any other server or virtual server inside the cloud numeral 50. The 502 is a computer program that can be run on any hardware or virtual server.

In some embodiments of the present invention, the hypervisor is able to ping the management IP addresses of all the switches. This is not an uncommon scenario. Usually every switch has a default VLAN and packets can be sent and forwarded through the default VLAN. The ports that connect one switch to another are also usually set in trunk mode such that they can carry the traffic of many VLANs, at least all of the VLANs that are configured on all the other ports of the switch that connect to end hosts.

Some embodiments of the present invention address the end host as a hypervisor even when the end host is not a hypervisor. The topology agent can take different forms, for example, a process, a daemon process, a VM, etc.

In some embodiments of the present invention it may be possible to implement some variations in the above described system. One attractive possible variation is to use layer 3 IP packets instead of layer 2 ethernet frames to make the topology agent implementation simpler. The topology agent still needs to be assigned a unique dynamically generated MAC address by the hypervisor. Before starting the process, it is better to have the MAC address of the topology agent cleared from the FDB tables of the switches in the network. The IP packets must be sent to the bridge management IP addresses.

In some embodiments of the present invention, the topology agent obtains a distinct and unique MAC addresses from the hypervisor and sends one ethernet frame to each switch in the network, each time using a different MAC address. In this kind of embodiment, there will generally not be a necessity to clear the MAC address of the topology agent before sending each ethernet frame. However, because it involves generating many unique dynamic MAC addresses, it may be a less attractive option when there are many switches in the network.

Some embodiments of the present invention may further include one, or more, of the following features, characteristics and/or advantages: (i) does not try to find a path from one node to another; (ii) determines to which switch, and to which port on that switch, a specific hypervisor is connected to; (iii) focuses on a server-virtualized data; (iv) specifically targets a server-virtualized environment; (v) proposes a specific customization in the hypervisor; (vi) does not assume knowledge of the physical network topology between the switches; (vii) starts the logic purely on demand by the user; (viii) start of the logic is not based on any triggers; (ix) uses the IP address of the end host, the hypervisor, to start the logic; (x) makes is easier to discover the layer 3 IP addresses, rather than to discover the layer 2 MAC addresses of the end hosts in the network; and/or (xi) has no relationship with the DHCP (dynamic host configuration protocol) server.

Some embodiments of the present invention may further include a method to: (i) customize the hypervisor with a specific topology agent to help in finding (for a specific switch and port) to which hypervisor it is connected to; (ii) generate a unique MAC address for the topology agent on the hypervisor; (iii) query if a MAC address is learned on the switch, and if an address is learned, on which port is it learned; (iv) clear a specific MAC address from its FDB table to eliminate stale data; (v) clear a specific MAC address from its FDB table to eliminate inaccurate analysis; (vi) determine whether the topology agent's unique MAC address is learned on the switches; (vii) determine the specific switch and port to which the hypervisor is connected based on data gathered from multiple switches; (viii) uniquely identifies the directly connected neighbor switch of an end device; (ix) generates L2 frames and sends the data to individual switches in the network to deliberately keep the FDB entries healthy; and/or (x) checks for the presence of a MAC address, specially crafted for the topology agent on various switches in the network. Further with regard to items (vi) and (vii), this method does not require the knowledge of the physical network connections among the switches.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for use with a topology agent running on a hypervisor and a plurality of switches connected in data communication through an ethernet, with each switch including a plurality of ports, and with each switch having a respectively corresponding bridge MAC (media access control) address, the method comprising:
   for each given switch of the plurality of switches, storing a forwarding database (FDB) in a memory of the given switch;
   for each switch of the plurality of switches, maintaining the FDB for the given switch by capturing which MAC addresses have been learnt on each port of the given switch and can be reached through each port of the given switch;
   preparing, by the topology agent running on the hypervisor, a first ethernet frame including a source MAC address having a value corresponding to a MAC address of the topology agent and a destination address of ethernet frame being a first MAC bridge address corresponding to a first switch of the plurality of switches;
   sending, by the topology agent and over the ethernet, the first ethernet frame; and
   for each given switch of the plurality of switches, checking the FDB stored in the given switch to determine whether the MAC address of the topology agent has been learnt on any of the ports of the given switch.

2. The method of claim 1:
   wherein the determination of whether the MAC address of the topology agent has been learnt on any of the ports of the given switch results in a determination that the MAC address of the topology agent has been exclusively learnt on a first port of the first switch;
   the method further comprises:
   responsive that the MAC address of the topology agent has been exclusively learnt on the first port of the first switch, outputting first switch direct connection data including information indicating that there is a physical connection between the hypervisor and the first port of the first switch.

3. The method of claim 1:
wherein the determination of whether the MAC address of the topology agent has been learnt on any of the ports of the given switch results in a determination that the MAC address of the topology agent has been learnt by a plurality of ports respectively belonging to multiple switches of the plurality of switches;

the method further comprises:
responsive that the MAC address of the topology agent has been learnt by a plurality of ports respectively belonging to multiple switches, outputting first switch indirect connection data including information indicating that there is an indirect data communication connection between the hypervisor and the first port of the first switch, with the indirect connection including an identification of the multiple switches.

4. A computer program product for use with a topology agent running on a hypervisor and a plurality of switches connected in data communication through an ethernet, with each switch including a plurality of ports, and with each switch having a respectively corresponding bridge MAC (media access control) address, the computer program product comprising:

a non-transitory machine readable storage device; and
computer code stored on the non-transitory machine readable storage device, with the computer code including instructions for causing a processor(s) set to perform operations including the following:
for each given switch of the plurality of switches, storing a forwarding database (FDB) in a memory of the given switch;
for each switch of the plurality of switches, maintaining the FDB for the given switch by capturing which MAC address(es) have been learnt on each port of the given switch and can be reached through each port of the given switch;
preparing, by the topology agent running on the hypervisor, a first ethernet frame including a source MAC address having a value corresponding to a MAC address of the topology agent and a destination address of ethernet frame being a first MAC bridge address corresponding to a first switch of the plurality of switches,
sending, by the topology agent and over the ethernet, the first ethernet frame, and
for each given switch of the plurality of switches, checking the FDB stored in the given switch to determine whether the MAC address of the topology agent has been learnt on any of the ports of the given switch.

5. The computer program product of claim 4 wherein:
the determination of whether the MAC address of the topology agent has been learnt on any of the ports of the given switch results in a determination that the MAC address of the topology agent has been exclusively learnt on a first port of the first switch;

the computer code further includes instructions for causing a processor(s) set to perform the following operation:
responsive that the MAC address of the topology agent has been exclusively learnt on the first port of the first switch, outputting first switch direct connection data including information indicating that there is a physical connection between the hypervisor and the first port of the first switch.

6. The computer program product of claim 4 wherein:
the determination of whether the MAC address of the topology agent has been learnt on any of the ports of the given switch results in a determination that the MAC address of the topology agent has been learnt by a plurality of ports respectively belonging to multiple switches of the plurality of switches; and the computer code further includes instructions for causing a processor(s) set to perform the following operation:
responsive that the MAC address of the topology agent has been learnt by a plurality of ports respectively belonging to multiple switches, outputting first switch indirect connection data including information indicating that there is an indirect data communication connection between the hypervisor and the first port of the first switch, with the indirect connection including an identification of the multiple switches.

7. A computer system for use with a topology agent running on a hypervisor and a plurality of switches connected in data communication through an ethernet, with each switch including a plurality of ports, and with each switch having a respectively corresponding bridge MAC (media access control) address, the computer system comprising:

a processor(s) set;
a machine readable storage device; and
computer code; wherein the computer code is stored on the machine readable storage device; the machine readable storage device is operatively connected to the processor(s) set so that the processor(s) set can execute instructions included in the computer code; the computer code includes instructions for causing the processor(s) set to perform operations including the following:
for each given switch of the plurality of switches, storing a forwarding database (FDB) in a memory of the given switch;
for each switch of the plurality of switches, maintaining the FDB for the given switch by capturing which MAC address(es) have been learnt on each port of the given switch and can be reached through each port of the given switch;
preparing, by the topology agent running on the hypervisor, a first ethernet frame including a source MAC address having a value corresponding to a MAC address of the topology agent and a destination address of ethernet frame being a first MAC bridge address corresponding to a first switch of the plurality of switches,
sending, by the topology agent and over the ethernet, the first ethernet frame, and
for each given switch of the plurality of switches, checking the FDB stored in the given switch to determine whether the MAC address of the topology agent has been learnt on any of the ports of the given switch.

8. The computer system of claim 7 wherein:
the determination of whether the MAC address of the topology agent has been learnt on any of the ports of the given switch results in a determination that the MAC address of the topology agent has been exclusively learnt on a first port of the first switch;

the computer code further includes instructions for causing a processor(s) set to perform the following operation:

responsive that the MAC address of the topology agent has been exclusively learnt on the first port of the first switch, outputting first switch direct connection data including information indicating that there is a physical connection between the hypervisor and the first port of the first switch.

9. The computer system of claim 7 wherein:

the determination of whether the MAC address of the topology agent has been learnt on any of the ports of the given switch results in a determination that the MAC address of the topology agent has been learnt by a plurality of ports respectively belonging to multiple switches of the plurality of switches; and the computer code further includes instructions for causing a processor(s) set to perform the following operation:

responsive that the MAC address of the topology agent has been learnt by a plurality of ports respectively belonging to multiple switches, outputting first switch indirect connection data including information indicating that there is an indirect data communication connection between the hypervisor and the first port of the first switch, with the indirect connection including an identification of the multiple switches.

* * * * *